Nov. 19, 1963  J. D. HARPER, JR., ETAL  3,111,613
SYNCHRO ROTATION MALFUNCTION TRANSLATOR
Filed April 8, 1960  3 Sheets-Sheet 1

John D. Harper Jr.
Aaron G. Loughead,
INVENTORS.
BY
ATTORNEYS.

Nov. 19, 1963 J. D. HARPER, JR., ETAL 3,111,613
SYNCHRO ROTATION MALFUNCTION TRANSLATOR
Filed April 8, 1960 3 Sheets-Sheet 2

2a

2b

2c

2d

2e

2f

2g

2h

2i

2j

2k

John D. Harper Jr.
Aaron G. Loughead
INVENTORS.

BY

ATTORNEYS.

Nov. 19, 1963 J. D. HARPER, JR., ETAL 3,111,613
SYNCHRO ROTATION MALFUNCTION TRANSLATOR
Filed April 8, 1960 3 Sheets-Sheet 3

3a

3b

3c

3d

3e

John D. Harper Jr.
Aaron G. Loughead,
INVENTORS.

BY
ATTORNEYS.

United States Patent Office 3,111,613
Patented Nov. 19, 1963

3,111,613
SYNCHRO ROTATION MALFUNCTION TRANSLATOR
John D. Harper, Jr., R.F.D. 4, Fayetteville, Tenn., and Aaron G. Loughead, 1100 Edgewood Ave. SE., Huntsville, Ala.
Filed Apr. 8, 1960, Ser. No. 21,063
6 Claims. (Cl. 318—24)
(Granted under Title 35, U.S. Code (1952), sec. 266)

The invention described herein may be manufactured and used by or for the Government for governmental purposes without the payment of any royalty thereon.

This invention relates generally to synchro systems and more particularly to a means for translating the output of a synchro transmitter into a novel form which has a number of usages including that of indicating the nature of a synchro malfunction.

Because of their many useful properties, synchronous transmitters and receivers find wide use as resolvers and servomechanisms and in telemetry devices. One of the difficulties in the use of synchros is locating a malfunction in a system employing one of them. This problem results primarily from the difficulty of distinguishing synchro defects from failures of other components in the system. Further, known trouble shooting techniques are complex and unwieldy and not infrequently fail to reveal the true nature of the failure, oftentimes simply indicating what general portion of the system is defective. In addition, test circuits currently employed, in addition to their complexity and certain inaccuracies, are adversely susceptible to vibration and shock.

Therefore, it is a purpose of this invention to provide a new device for translating the output of a synchro into a new form which, among other uses, may be employed to indicate the precise cause of synchro malfunction, and will be relatively immune to vibration.

It is a further object of this device to provide a novel malfunction indicator which will present a minimal load to the synchronous device to which it is connected.

It is still a further object of this invention to provide a null indicator useful in many applications.

This invention will be more fully understood from the following description and drawings, in which.

Figure 1:
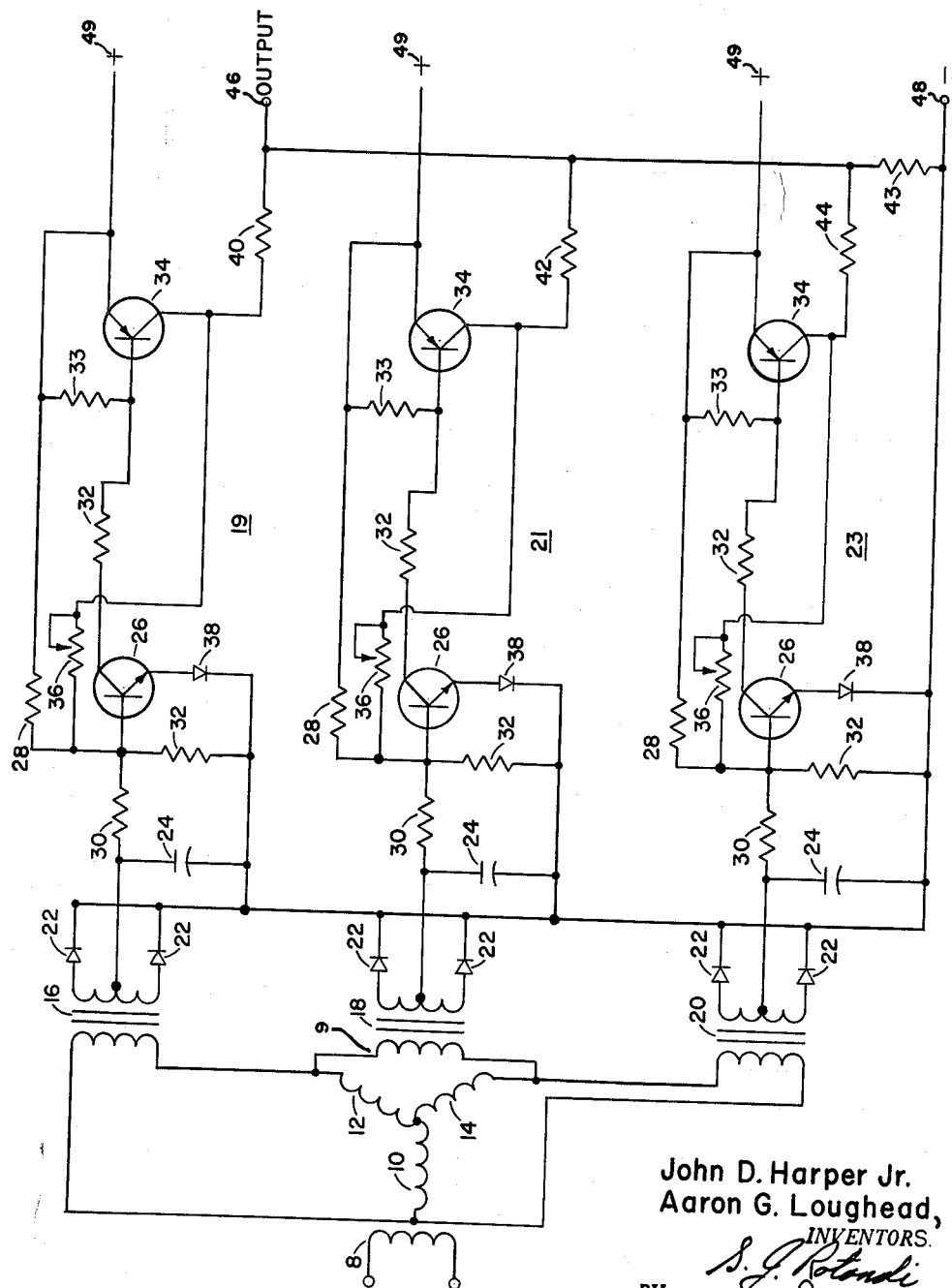
FIGURE 1 is a schematic circuit diagram of an embodiment of the invention.
Figure 2:
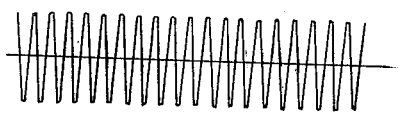
FIGURES 2 and 3 show waveforms of various indications provided by the embodiment of the invention shown in FIGURE 1.
Figure 2:
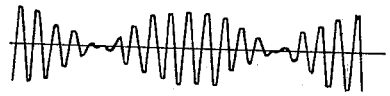
Figure 2:
Figure 2:
Figure 2:
Figure 2:
Figure 2:
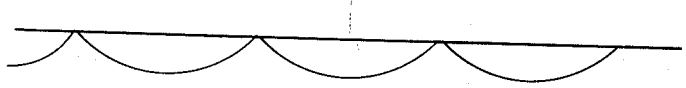
Figure 2:
Figure 2:
Figure 2:
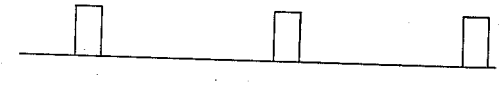
Figure 2:
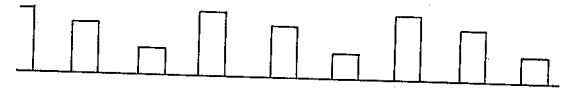

Referring to FIGURE 1 there is shown a synchronous transmitter consisting of rotor 8, to which is applied the alternating potential illustrated in FIGURE 2a, and stator 9 with windings 10, 12 and 14. The primaries of transformers 16, 18 and 20 are connected, respectively, across series connected stator windings 10—12, series connected stator windings 12 and 14 and series connected stator windings 14 and 10.

The outputs of transformers 16, 18 and 20 due to rotation of rotor 8 shown, respectively, in FIGURES 2b, 2c and 2d, are rectified by rectifiers 22, filtered by small filter capacitors 24, and applied, respectively, to substantially identical pulse coding circuits 19, 21 and 23. The resulting waveforms applied to these circuits are shown, respectively, in FIGURES 2e, 2f and 2g. Considering first, pulse coding circuit 19, this circuit consists of a two stage regenerative amplifier, which, responsive to the input waveform, provides an output pulse with a coded height. The first stage employs NPN transistor 26 which is biased through resistor 28 from positive voltage source 49, to conduct in the absence of a signal or a preselected level of signal applied thru resistor 30. The negative half cycle input waveforms, illustrated by FIGURE 2e, are applied thru resistor 30 across input resistor 32 to the base of transistor 26. The result is that transistor 26 is kept cut off except during the period when the input wave is near zero potential. When transistor 26 starts to turn on, a regeneration action occurs which produces a relatively quick transition. This is accomplished by directly coupling the output across resistor 33, of transistor 26 from its collector thru resistor 32 to the base input of PNP transistor 34, and directly connecting the collector output of transistor 34 in phase thru resistor 36 to the base input of transistor 26. Turn-off, which occurs when the input wave drops (goes negative) from near zero, is equally fast. The quick transition is further aided by diode 38 connected in series with the emitter of transistor 26. The result, a null indication, is a positive output pulse illustrated by FIGURE 2h. Its magnitude is adjusted by the value of output resistor 40 which is connected between the collector of transistor 34 and output resistor 43, across which the output voltage appears. Output resistor 42 in pulse coding circuit 21, and output resistor 44 in pulse coding circuit 23 are adjusted in value to provide different magnitude outputs across circuit output resistor 43. The outputs are coded in this manner. The output of coding circuit 21 is illustrated in FIGURE 2i and the output of coding circuit 23 is shown in FIGURE 2j. The composite circuit output taken across terminals 46 and 48 is illustrated in FIGURE 2k. Except as to output resistors 42 and 44, pulse coding circuits 21 and 23 are identical and function identically to pulse coding circuit 19. The pulse width of each pulse is conveniently adjustable by varying the value of resistor 36. Since each amplifier has a different output, identified by a corresponding amplitude, the original stator windings may be identified. The output will appear staggered in the X axis as shown because of the phase lag between the stators of 120° each.

Figure 3:
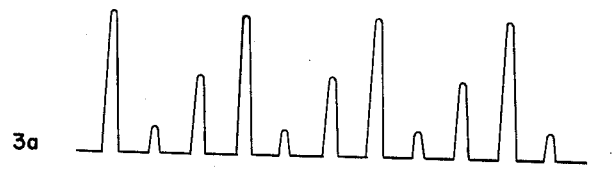
Figure 3:
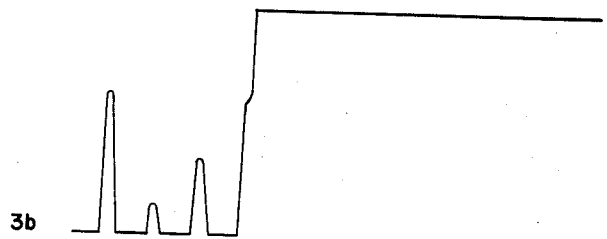
Figure 3:
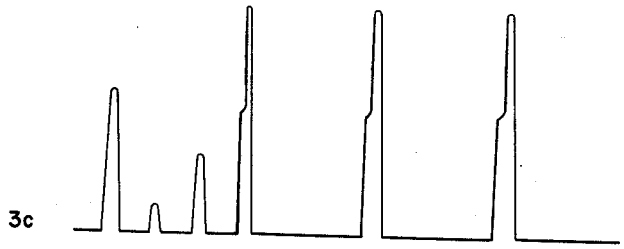
Figure 3:
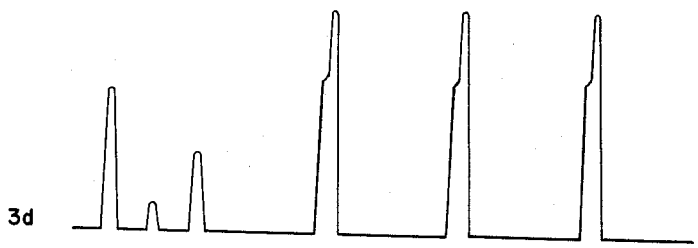
Figure 3:
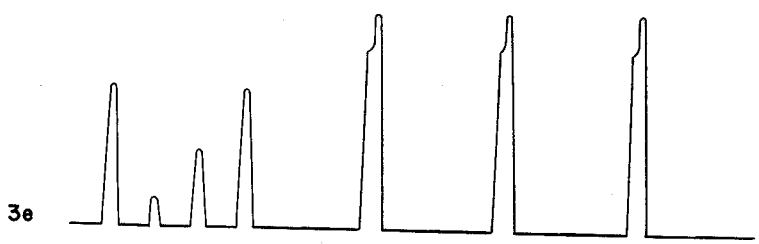

In order to clarify operation of this device, observe the change of output waveforms with different malfunctions of the device shown in FIGURE 3. The waveform of FIGURE 3a, like that of FIGURE 2k, is taken across output terminals 46, 48; the difference being that the theoretical or desired waveform is shown by FIGURE 2k while the actual waveform is shown by FIGURE 3a. FIGURE 3a is a normal output; FIGURE 3b results when the rotor winding 8 opens; FIGURE 3c shows the result when stator winding 10 is open; FIGURE 3d occurs when stator winding 12 is open; and FIGURE 3e occurs when stator winding 14 is open.

As can be seen by the above mentioned figures, the device gives an easily identified indication of a malfunction, and further, gives a waveform whereby the exact nature of the malfunction may be determined. The extreme simplicity of the output waveforms of this device permits rapid and facile transmittal by telemetry.

The positioning and point of displacement of each of the pulses, or "steps," may further be translated into a rough or approximate indication of the synchronous device position. It may be seen that, since the pulse train is repeated twice per revolution, the resolution of such a system is ⅙ of a total revolution, or ±30°. This added feature of the invention will allow its use in low resolution systems in order to replace both resolvers and malfunction indicators. As a further feature, one or more of resistors 36 could be made responsive in value to ambient temperature or some other condition, the result being that the pulse width of the effected pulse is modulated thereby. It can, therefore, be seen that both singly and in combination with other devices, many other applications and forms are possible, hence it is desired that in construing the breadth of the appended claims, they not be limited by the illustrated embodiment herein.

Therefore, what is claimed, and is desired to be secured by Letters Patent of the United States is:

1. A synchro signal coding system comprising:
   (a) a synchronous transmitter,
   (b) first, second, and third rectifying means,
   (c) each of said means being responsive to a particular phase of said transmitter,
   (d) first, second, and third substantially identical pulse coding circuits,
   (e) each of said coding circuits responsive to numerically corresponding said rectifying means,
   (f) each of said coding circuits including a two stage regenerative amplifier,
   (g) the first stage including a N-P-N transistor and the second stage including a P-N-P transistor,
   (h) each of said stages being of common emitter configuration, and
   (i) a resistive positive feedback path being connected between the collector of the second stage transistor and the base of the first stage transistor.

2. A coding system as in claim 1, wherein:
   (a) the base of each of said first stage transistors is connected to a positive voltage source so that said first stage transistors are normally biased to conduct,
   (b) each of said rectifying means provides an input signal to the base of each of said first stage transistors,
   (c) said signal is poled to bias said first stage transistors for a period of substantial non-conduction, and
   (d) each of said first stage transistors provides an output pulse when said input signal is near zero.

3. A coding system as in claim 2, wherein:
   (a) each of said first stage transistors has a series connected diode in the common emitter leg, and
   (b) said diode is poled to pass current in the same direction as the emitter of said first stage transistor.

4. A coding system as in claim 3, wherein:
   (a) each of said second stage transistors has a resistor series connected in the collector leg, and
   (b) each of said resistors has a different value so that the signal developed across each of said resistors varies in magnitude.

5. A coding system as in claim 4, wherein:
   (a) a circuit output resistor is series connected with each of said resistors connected in the second stage emitter leg, and
   (b) a coded signal having three separate output pulses of varying magnitude is developed across said output resistor.

6. A coding system as in claim 5 wherein:
   (a) each of said pulse coding circuits has a variable resistor connected between the collector of said second stage transistor and the base of said first stage transistor, and
   (b) the width of said output pulses may be adjusted by changing the value of said variable resistor.

References Cited in the file of this patent
UNITED STATES PATENTS 2,811,693   Holzwarth et al. _____ Oct. 29, 1947

OTHER REFERENCES

Lauer, Lenick, Matson: Servomechanism Fundamentals, first edition, pp. 28, 29, McGraw-Hill, New York, 1947.

Terman, F. E.: Electronic and Radio Engineering, fourth edition, page 659, sec. 18–16, McGraw-Hill, New York, 1955.

RCA Receiving Tube Manual (1950), p. 33, FIG. 35, published by RCA, Harrison, N.J., 1950.

Terman, F. E.: Electronic and Radio Engineering, 4th edition, page 778, FIGS. 21–30, McGraw-Hill, New York,